Patented Feb. 23, 1954

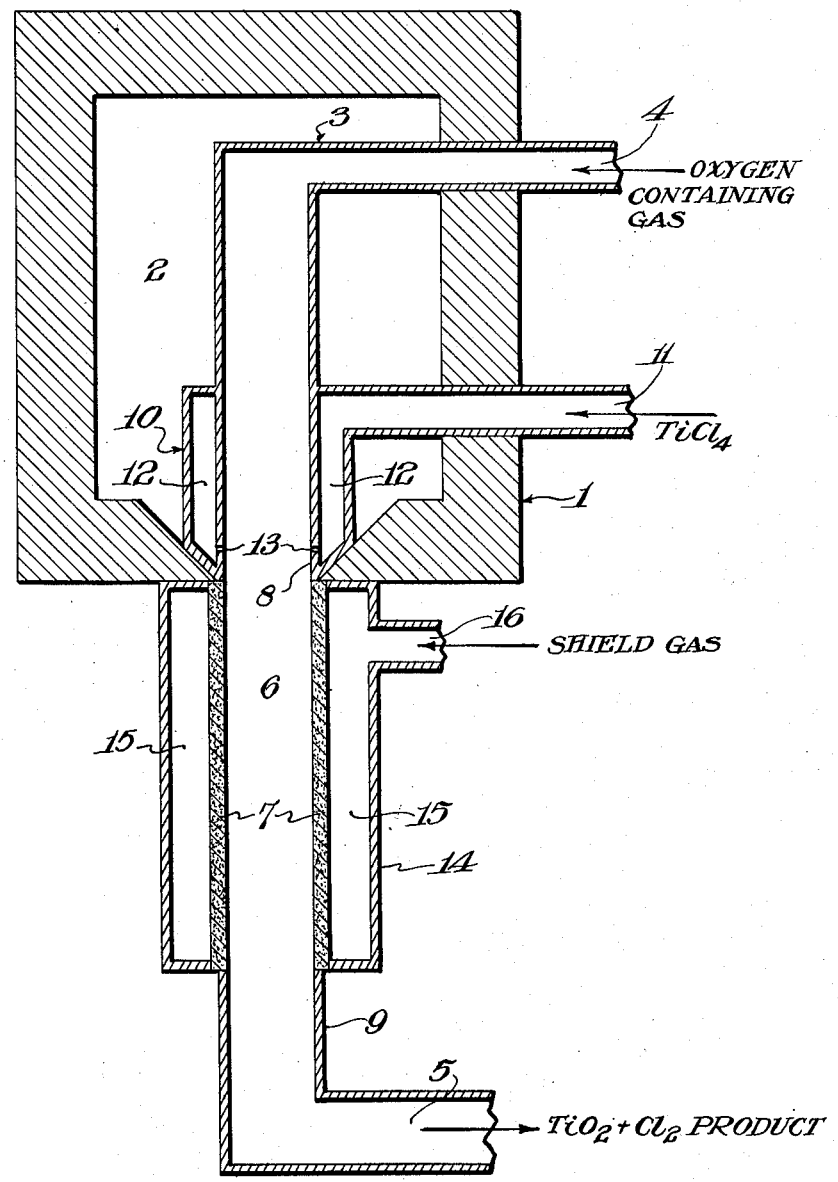

2,670,275

UNITED STATES PATENT OFFICE 2,670,275

METAL OXIDE PRODUCTION

Carl M. Olson, Newark, and John Nelson Tully, Wilmington, Del., assignors to E. I. du Pont de Nemours & Company, Wilmington, Del., a corporation of Delaware Application September 2, 1950, Serial No. 182,922

10 Claims. (Cl. 23—202)

This invention relates to the production of metal oxides through the vapor phase oxidation or hydrolysis of their halides, and more particularly to the preparation of pigmentary, finely-divided titanium oxide by reaction of an oxygen-containing gas with vaporous titanium tetrachloride.

It is known that metal oxides may be produced by the oxidation or hydrolysis of vaporized metal halides. In such processes a volatilized metal halide, such as a chloride of iron, titanium, silicon, aluminum, etc., is reacted at elevated temperatures with oxygen, air, or like suitable oxygen-containing gas to form the respective oxide of the metal and chlorine. Similarly, the volatilized metal chloride can be reacted with steam from which the desired metal oxide and hydrogen chloride is obtained.

In such prior processes, a portion of the oxide product formed deposits upon and tenaciously adheres to the internal surfaces of the reactor, instead of being swept out of such reactor by the gas stream. This is very objectionable for several reasons. Among other reasons, a portion of the powder is thereby lost, since it frequently packs or sinters to such an extent that it cannot be recovered in useful form. Again, if the oxide forms in a desirable state, the different conditions prevailing at the surface of the reactor over those existing within the reaction space cause an undesired particle size growth and crystallinity change which renders the product unfit for an intended or pigmentary use. Even where loss of material can be tolerated, segments thereof frequently dislodge from the reactor walls and contaminate the desirable products being recovered from the operation. A further objection resides in the undesired alteration in the configuration of the internal surfaces and dimensions of the reactor which the presence of the deposited mass induces. In processes of the type mentioned, equipment design is frequently a critical factor and even minor dimensional changes cannot be tolerated. Furthermore, if reaction product build-up proceeds for too long a period, the vessel will be completely blocked off or plugged and shut-down for dismantling and clean-out is then necessary. A still further disadvantage is the inhibiting effect on heat transfer which the presence of the deposited solid exerts. It is often necessary to add to or remove from the reaction mixture substantial quantities of heat, which is conveniently accomplished by means of heat transfer through the reactor walls. Obviously, the presence of a relatively thin layer of solid, non-conductive reaction product upon such walls is often sufficient to retard heat flow to a considerable, undesired extent, especially when such solid is in finely-divided state and interspersed with minute gas pockets.

A wide variety of proposals for removing deposits of this type has been suggested, including mechanical scraping. Unless the equipment is shut down during the scraping, the presence of corrosive substances at elevated temperatures renders the choice of suitable materials of construction, or design of operable stuffing boxes, extremely difficult. Furthermore, the scraping must be effected at extremely frequent intervals, or the deposit will become so hard and adhere so tightly to the reactor surfaces that the scraper will either fail to dislodge it, or damage the surface in doing so. Contamination of product with fragments of build-up is an attendant disadvantage. Chemical removal can be resorted to, but this ordinarily requires expensive shut-downs with considerable loss of time being incurred in the process. Careful design of equipment to minimize to some extent the opportunity for forming objectionable deposits can be resorted to, but in most cases equipment design is so rigidly prescribed by the demands of the process itself that variation therein for the purpose of preventing such build-up results in objectionable loss of yield, reduction in product quality, and increased costs. It has been proposed to introduce the halide through a shielding gas envelope, so that the reactants do not mix until they are in the central portion of the reaction vessel. While it is theoretically possible to eliminate wall build-up by arranging jets which will sweep all the surface of the vessel with a stream of gas, for example air or chlorine, this procedure has the disadvantage of requiring enormous quantities of shielding gases. Unfortunately, in obtaining products in desirable form it is essential that reactants be mixed rapidly in a confined space and diluted as little as possible, requirements which are diametrically opposed to the needs of a gas shielding type of operation. Formation of tightly-adhering deposits of coarsely crystalline material may be prevented for a relatively short period by maintaining the reactor walls at temperatures below those at which the reaction takes place. This procedure, however, does not prevent formation of an insulating layer of oxide product or pigment, so that objectionable coarse material soon forms anyway.

From the foregoing, it is evident that, for economy of operation and production of oxide materials of optimum characteristics, a real need exists for a useful, workable method for preventing or minimizing the formation and deposition of tightly-adhering metal oxide upon the surfaces of a reactor exposed to the vapor phase oxidation or hydrolysis of a metal halide in which such oxide is produced.

It is accordingly among the principal objects of this invention to overcome the disadvantages which attend prior methods for the vapor phase oxidation of metal halides and to provide a novel and effective method and apparatus for accomplishing such objects. It is among the particular objects of the invention to effect the production of valuable forms of pigment-useful metal oxides without attendant formation of objectionable oxide deposits on the surfaces of the apparatus employed in such production, and to provide a novel form of apparatus which may be operated continuously, over long periods of time, and which in no way limits the choice of conditions which are favorable to production of maximum yields of optimum quality products. A further and special object is to provide a relatively simple and effective method and apparatus for continuously manufacturing pigmentary titanium dioxide through the vapor phase oxidation at elevated temperatures of titanium tetrachloride while avoiding formation of objectionable oxidic scale formation and deposition and resulting apparatus plugging which has characterized prior $TiCl_4$ oxidation processes. Other objects and advantages of the invention will be apparent from the ensuing description and accompanying diagrammatic drawing, wherein the figure is a vertical, sectional view of one useful, illustrative form of apparatus suitable for adapting the invention to practical application.

These and other objects are attained in this invention which comprises vapor phase reacting a metal halide with an oxidizing gas within a confined reaction zone comprising a substantially solid, porous refractory material, and during said reaction diffusing a gaseous medium into said zone through said material sufficient in amount to provide a protective gas film over and shield the internal surfaces of said zone from substantial contact with said reactants.

In a more specific embodiment, the invention comprises reacting, preferably at temperatures in excess of 1000° C., vaporized titanium tetrachloride with a humidified oxygen-containing gas, effecting said reaction within a restricted, tubular conduit comprising a solid, porous refractory substance, and throughout said reaction maintaining a layer of an inert gas within and over the internal surfaces of said zone by diffusing said gas slowly and continuously through said substance from an extraneous source maintained about said zone whereby said surfaces become shielded from and are maintained out of contact with said reactants.

Referring to the embodiment of the invention illustrated in the accompanying drawing, there is shown a vertically-arranged furnace 1 which can be wholly or partly insulated and heated in accordance with conventional, desired means. Suitably disposed within the heating chamber 2 of the furnace 1 is a tubular element 3, composed of corrosion-resistant metal or other suitable and desired material, having an inlet 4 and an outlet 5 through which reaction products are withdrawn for recovery. Substantially intermediate the length of said tubular element, a reaction zone 6 is provided, the defining side walls 7 of which form, as shown, a continuation of walls 8 and 9 of tubular element 3. The reaction zone walls 7 comprise a porous, refractory material such as porous (unglazed) porcelain, silica, nickel, steel, etc., or other suitable solid substance adapted to enable an inert gas (nitrogen, carbon dioxide, helium, argon, etc.) to readily diffuse therethrough and for a purpose and in a manner to be presently referred to. Suitably disposed above the porous, tubular reaction zone 6 and in concentric, spaced relationship about tubular element 3, is a second tubular element 10. This is also constructed of corrosion-resistant metal or other material adapted to withstand relatively high temperatures and the corrosive action of fluids subjected to reaction within the apparatus. The element 10 is provided with an inlet 11 communicating with a passage 12 and terminates as an annular discharge or slotted jet outlet 13, formed by interpositioning, as shown, portions of tubular element 3 in close proximity to each other. Said outlet 13, passage 12 and inlet 11 are maintained in open communication with the interior of conduit 3 as well as reaction zone 6. Concentrically arranged in spaced, substantially enveloping and gas-tight relationship about the cylindrical, porous walls 7 of the porous, tubular reaction zone 6, is a cylindrical element 14, also made up of corrosion-resistant metal or like material, which forms a passage 15 and is provided with an inlet 16 through which an inert gas from a source of supply (not shown) can be constantly maintained at any desired pressure about the said porous walls 7 and reaction zone 6.

The operation of an apparatus of the type described will now be detailed and with particular reference to one preferred adaptation of the invention in which production is effected of titanium dioxide, in accordance with, for example, the methods disclosed in U. S. Patent No. 2,488,439, dated November 15, 1945, to Holger H. Schaumann. In that patent rutile or anatase pigmentary $TiO_2$ is obtained by decomposing in the vapor phase a titanium halide, such as titanium tetrachloride, with an oxidizing gas such as oxygen, air, oxygen-enriched air, or mixtures thereof with various inert gases, and in the presence of regulated, small amounts of water vapor. In such decomposition, temperatures ranging above 800° C., and particularly in excess of 1000° C., and up to, say, 1350° C. or 1450° C., or higher, are resorted to. In applying such a method to this invention, the oxidizing gas, suitably humidified with from, say, about 0.05% to 10%, and preferably from 0.1% to 5% (based on the total volume of gases) of water vapor, is charged separately and continuously into the furnace 1 of the reactor through tubular conduit 3 and via inlet 4 thereof to ultimately pass and discharge into the porous walled reaction zone 6. During such passage, heating of the oxidizing gas to any desired preheat or reaction temperature is effected, and immediately prior to its injection into the reaction zone 6 it becomes rapidly mixed with vaporized, anhydrous titanium tetrachloride being concurrently, continuously and separately, to such reactor and from a source of supply (not shown) via its inlet 11, passage 12, and the annular slot jet means 13, so that it charges into the oxidizing gas, passing through conduit 10, in the form of a relatively thin sheet or stream, preferably in a direction at right angles to and across the axis of flow of such gas. The mixed reactants immediately pass into the reaction zone, wherein complete reaction at the indicated temperatures is effected, the TiCl4 being oxidized to TiO2 and chlorine. The resulting reaction products containing the TiO2 in suspension are then withdrawn from the reactor via its outlet 5, quickly cooled or quenched to temperatures below 600° C., in order to prevent undesired TiO2 particle growth, as contemplated in said Patent 2,488,439, and the pigmentary TiO2 is recovered.

Simultaneously with and throughout the introduction, passage and reaction of the oxidizing gas and titanium tetrachloride reactants within the reactor, an inert gas of the type above mentioned is, in accordance with the invention, constantly introduced into and maintained within the confining space or passage 15 of the larger-diameter cylindrical jacket member 14 which is sealed about and exteriorly surrounds the porous wall 7 of the tubular reactor 6. Preferably, the inert gas is maintained within said passage under an elevated pressure at least slightly in excess of that prevailing within the reaction zone 6 and adequate to force or cause the gas to slowly and steadily flow or diffuse through the pores of said wall 7 into the interior of the reaction zone. As a result, a protective film or layer of an insulating or shielding gas is formed over and upon the internal surfaces of said zone and effectively prevents or minimizes contact of said reactants or their resulting reaction products with the internal surfaces of the reactor to avoid objectionable oxide scale deposition or build-up thereon.

To a clearer understanding of the invention, the following specific examples are given, which are merely illustrative of specific applications of the invention and are not to be construed as in limitation of its underlying scope and effect:

EXAMPLE I

In this example, a reactor of the general structure shown in the accompanying drawings was employed, in which the porous, tubular reaction zone assembly comprised a porous porcelain tube 7" in length, having a 1¾" internal diameter and 2" outer diameter, with an average pore radius of 2.2 microns. This tubular element was enclosed in a fused silica jacket of the same length having an internal diameter of 3⅜" and provided with two perforated silica tubes for the even distribution of the shielding gas within the space separating the porous tube and its jacket. The circumferential jet or slotted inlet was enclosed within the furnace which was maintained at 1020° C., but the porous tube assembly was exposed to the atmosphere for cooling purposes. Dry nitrogen at 20° C. was passed into the jacket space and forced through the walls of the porous tube into the reaction zone at the rate of 37.6 gram moles per hour. The reactants were separately introduced into the reactor through silica coils in a preheating chamber also maintained at 1020° C., and at the following rates in gram-mols per hour:

| | |
|---|---|
| TiCl4 | 25.7 |
| Dry air (containing 0.058% H2O) | 37.6 |
| Wet air (containing 1.10% H2O) | 110 |

After 45 minutes of operation the tube was inspected and it was found that the bottom 6½" were completely free of oxide deposit. The top ½" of the porcelain tube held 7.6 grams of coarse, crystalline TiO2, representing 0.5% of the TiO2 thruput, this being attributable to the fact that this portion of the tube was heated due to being adjacent the jet furnace. An excellent quality TiO2 pigment was obtained, with complete reaction, such product exhibiting satisfactory hiding power, tinting strength, and particle size uniformity.

EXAMPLE II

Example I was duplicated, using the same temperatures and flow rates of reactants but employing a porcelain tube element 1½" I. D. x 2" O. D. x 6⅛" long, with an average pore radius of 12.5 microns, through the walls of which nitrogen was forced at a rate of 35.5 gram mols per hour. After 72 minutes of operation an excellent quality TiO2 pigment was recovered and the top ⅝" of the porous tube was found to contain 13 grams of crystalline deposit; the bottom ½", 1 gram of soft pigment deposit; and the central 5½", 0.6 gram of soft pigment. This totaled but 0.58% of the TiO2 thruput with some of the deposit at top and bottom resulting from the sealing off of the porous wall by the edge of the jacket which would be avoided in larger size equipment construction.

EXAMPLE III

In an apparatus of the general construction shown in the drawing but containing a porous refractory reaction zone tube, 1" I. D. x 1⅛" O. D. x 3" long, having an average pore radius of 2.2 microns, fitted with a fused silica jacket having an internal diameter of 2½", and in which the porous tube assembly was exposed to the atmosphere for the purpose of cooling, 7 mols per hour each of chlorine and carbon monoxide were passed into the jacket passage and through the walls of the porous tube, at a temperature of 20° C. Oxygen and TiCl4 reactants were separately introduced to the reactor, being added via a preheating chamber and jet maintained at 1005° C. and at the following rates in gram mols per hour:

| | |
|---|---|
| TiCl4 | 34 |
| O2 (dry) | 18 |
| O2 (containing 1.1 mols/hour H2O) | 18 |

After 10 minutes, the run was discontinued to inspect the condition of the interior of porous tube. No observable oxide deposit was found to exist on its internal walls.

In a comparable operation to the above examples, but in which a non-porous silica tube reactor was used as a control instead of a porous type tube in conjunction with an inert gas, and both the jet and reactor placed in a furnace at 1000° C., it was found that after only 13 minutes of operation all parts of the internal walls of the reactor were covered with coarsely crystalline titanium oxide scale which weighed in the aggregate 44 grams, or 10.5% of the TiO2 thruput.

Difficulties with build-up are most severe in small-scale experiments such as those described. In plant scale equipment, where the ratio of exposed surface to the volume of reactants, and to the weight of products is greatly diminished, the invention will be found to be most usefully effective. The following example demonstrates the value of the invention in a larger size oxidation plant.

EXAMPLE IV

An apparatus of the general structure shown in the drawing was employed, with a porous silica refractory tube, having an average pore radius of 2 microns, and 5½" I. D. x 27" long, being used as the tubular reaction zone, the unit being adapted to produce 100 pounds per hour of pigmentary titanium dioxide. Said tube was enclosed in a fused silica jacket, exposed to the atmosphere for cooling, and dry nitrogen at a rate of 350 gram mols per hour was continuously passed through the walls of the porous tube into the reaction zone. The reactants were preheated to about 900° C. and were introduced at the following rates, in gram mols per hour:

| | |
|---|---|
| TiCl₄ | 567 |
| Dry air | 870 |
| Moist air | 2100 |

(providing 28.4 gram mols per hour H₂O) into the reactor through a cooled jet, maintained at 200° C. The moisture for the "moist air" stream was added by burning hydrogen in oxygen in the line just ahead of the jet, so that additional heat was provided. After one hour of continuous operation, the porous tube was inspected, and was found to contain only light traces or dusting of soft, pigmentary TiO₂ on portions of its lower third, which would in no way have hindered continued operation.

A similar and comparable run was made but with a fused, non-porous silica tube having the same dimensions as those of the porous tube used above. In this instance it was necessary to stop the reaction at ten minute intervals to scrape out the silica tube, to remove deposited TiO₂ and in order to enable the run to proceed. After a net running time of one hour, further operation had to be discontinued due to hard scale formation and build-up on the internal surfaces of the silica tube which the scraper could not remove without danger of damaging the tube. This build-up in the run was found to total 8½% of the TiO₂ throughput.

EXAMPLE V

Example I was duplicated, except that air preheated to 800° C. and containing .95 H₂O by volume was employed as the oxidizing gas, and was continuously charged at a rate equivalent to 19 parts by weight of O₂ per hour through the reactor. Simultaneously vaporized TiCl₄ at a temperature of 865° C. was continuously charged at a constant flow rate of 100 parts by weight per hour to the reactor and issued from its peripheral slot jet inlet as a sheeted stream and across the air stream being conveyed to the reaction zone. Instantaneous reactant mixing thereby took place with complete reaction at a temperature of 1150° C. occurring in the reaction zone and with an average retention time of reactant gases therein being only .13 second. The TiO₂ suspension issued from the reactor outlet at a temperature of about 1000° C. and was immediately quenched (within 2 seconds) to 300° C. by commingling therewith sufficient cold chlorine gas. The TiO₂ product was then separated and recovered from the cooled reaction products in a conventional type filter, and comprised a high-grade rutile pigment. As a result of this operation, substantially 100% TiCl₄ conversion was found to take place, and upon inspecting the interior of the porous tubular member employed as the reaction zone at conclusion of the run, its surfaces were found to be free of any objectionable oxidic scale deposit.

EXAMPLE VI

Example I was duplicated except that in lieu of the porcelain reaction zone employed in the reactor assembly of that example, use was made of a .1" thick porous nickel tubular element having an average pore radius of 25 microns and of equal length and internal diameter with the porcelain tube. A ¼" tubular nickel coil was disposed about the exterior of this porous tube, and a heat transfer oil cooling fluid was continuously circulated therethrough to maintain the porous wall reactor in relatively cool state during the reaction. The porous nickel element and cooling coil were enclosed within a fused nickel jacket element, the internal diameter of which was 4" and in which perforated nickel tubes were provided for promoting even distribution of the shielding gas within the space separating the porous tube from said jacketing member. In the operation the dry nitrogen was passed into the jacket space and forced through the walls of the porous nickel tube into the reaction zone at a rate of 42 gram mols per hour. After 45 minutes of operation, substantially the same results as those shown in Example I were realized.

Although the invention is described in the above examples as applied to certain specific embodiments wherein particular reactants, temperatures, retention times, ratios, velocities, apparatus, etc., have been employed, it obviously is not limited thereto. It will be understood, therefore, that variance therefore can be resorted to without departing from its underlying principles and scope. Thus, while the invention is outstandingly useful for converting TiCl₄, through oxidation, to TiO₂ to obtain a high-quality pigment therefrom, it is also utilizable in the oxidation of other titanium halides or mixtures, and especially the chlorides, bromides or iodides of that metal, as well as those of such additional metals as zirconium, aluminum, silicon, antimony, tin, zinc, etc., which react in the vapor phase with an oxygen-containing gas of the type herein contemplated to produce a solid, preferably white, metal oxide.

Again, while air, suitably enriched with H₂O in the amounts mentioned, comprises a preferred, useful form of oxidizing gas, if desired, other types and amounts of oxidizing gases or mixtures thereof, in either dry or humidified state, and such as those already mentioned, can be employed.

Normally, the oxidation reaction is conducted at atmospheric pressure, but, if desired, it may be effected at super or subatmospheric pressures, and the differential in inert gas pressure can be correspondingly varied. Similarly, any type or size of reactor conforming to the intended scale of operation can be used in applying the invention; and while resort to a continuous operation is preferred, a discontinuous or batch type of procedure can also be adopted, if desired. The time of retention of reactants and resulting oxide product within the reaction zone is quite critical and important where pigmentary TiO₂ is being produced. In such instance, reactant retention times ranging from about .01 to 5 seconds are generally resorted to, with a preferred time ranging from .1 to 1 second. With such retention times, undesired particle size growth due to sintering of aggregates is avoided, which, if allowed to take place, would deleteriously affect ultimate TiO₂ pigment properties, especially tinting strength.

In the accompanying Fig. 1, which is a diagrammatical view of a simplified apparatus for carrying out one embodiment of the invention, the reaction vessel comprises a cylindrical porous refractory tube, sealed into a gas-tight jacketing cylinder of larger diameter having an inlet for the introduction of the inert gas into the space surrounding the porous reactor. The gas pressure within this space is maintained slightly higher than that in the reaction zone itself, so that the gas will flow slowly and steadily from the jacket through the walls of the porous tube and into the reaction zone to provide a protective gas film on the wall surfaces of the reaction zone exposed to the reactants and products. The gaseous reactants, at elevated temperatures, are introduced into the reaction vessel in the usual way, through a jet system designed to accomplish rapid mixing. In the particular case illustrated, it was desired to remove heat produced by the reaction, and this was accomplished by the use of unheated shield gas and by radiation and conduction through the walls of the vessel. Where large quantities of heat must be transferred through the vessel walls or such walls maintained in relatively cool state, resort can be had to a cooled type of inert gas, to provide radiating fins, cooling coils, or other well-known heat dissipating means which promote heat transfer, or to a combination of such media.

For the sake of simplicity, a single gas inlet into the jacketing space is shown in the drawings. In some applications this may not afford complete and adequate distribution of the protective gas. The effectiveness of the shielding film will be found to depend on its continuity over the entire reaction zone surface to be protected, and it will frequently be found advantageous to resort to a manifold for effectively apportioning the gas thereover, so that protection of all parts of the surface will be assured, even with a minimum quantity of shielding gas.

Also, though in the accompanying drawing the invention has been applied only to the protection of the reaction vessel or zone itself, obviously the principle may be extended to the protection of the inlet jet as well, or any other reactor surfaces on which objectionable oxide deposits may occur. It is particularly convenient, in an apparatus such as that shown, to extend the porous tube up into the jet, so that it terminates to form one side of the slot jet inlet through which the titanium tetrachloride is admitted. If build-up should be encountered on both faces of a given wall, a double porous wall, spaced to provide a passage or channel for the introduction of the shielding gas can be employed. Other possible variations in the apparatus illustrated will suggest themselves to those skilled in the art.

As already indicated, many different types of porous refractory materials are suitably useful in the invention. The choice for a particular application will depend upon such conditions as temperature, type of reactants, exposure to corrosive chemicals, and mechanical strength required. The size range, uniformity of size and distribution of pores in the refractory material, and size of the minute partitions between the pores will obviously affect the distribution of the shielding gas and consequently the ease with which a protective film is maintained within the reactor. As noted, porous type porcelain or ceramic bodies are generally utilizable herein as a tubular porous oxidizing chamber, as are porous silica or porous metallic bodies composed of nickel, aluminum, steel, etc. These porous refractories can be readily prepared by molding a granular or powdered form of the make-up material to the desired shape and then sintering it at a temperature adequate to bond the crystals together, but insufficient to convert the crystals to flowing condition. Thereafter, the sintered product is cooled and hardened. Examples of conventional methods for preparing such refractories comprise those referred to, commencing at page 167 of Powder Metallurgy by P. Schwarzkopf, published 1947 by MacMillan Company. The minimum usable pore size depends on the size of the gas molecules to be passed through the refractory. For example, when helium is used as the inert gas, a smaller pore size is employed than when carbon dioxide is used. Generally, an average pore radius of less than 100 microns is resorted to, a preferred pore range being from 0.05 micron to 25 microns. If a material having exactly the properties desired is unavailable, one of larger or less uniform pore size can be adapted for use by applying a porous coating thereto, such as by burning a metal halide within the element, the inner surface of which is to be protected, or by spraying or filtering a suspension of the solid in a suitable fluid onto such surface. The effect of pore size will then be determined by the nature of the applied material.

Resort can be made to many different gases for forming our reactor surface shielding film, the choice of gas being dependent upon the needs of a particular application. Generally, any medium or mixture thereof which is gaseous at normal temperatures or pressures can be resorted to in the contemplated shielding operation. Examples thereof include air, oxygen, nitrogen, carbon dioxide, chlorine, etc., as well as the members of Group Zero of the periodic system (helium, argon, neon, etc.), with those which are inert and non-reactive toward the metal halide reactant being preferred for use. To minimize dilution and provide a small amount of gas needed to establish reactor surface protection, one of the gaseous reaction products may serve as a component of the shielding gas or the mixed product gases of the reaction may be recycled for use in conjunction with the inert gas. Thus, in the co-pending application Serial No. 658,868, of Kraus and Schaumann, filed April 1, 1946, removal of oxide build-up by means of gases which chemically combine with the oxide is disclosed. Adaptation of that method for use in conjunction with the present invention to insure a continuous process affords an effective method for preventing scale formation, since any particles which might in some way penetrate the gas film will be quickly removed by dissolution. A particular embodiment of the invention of that application involves the use of a mixture of carbon monoxide and chlorine for the vapor phase oxidation of titanium tetrachloride. Titanium dioxide particles which penetrate into the gaseous film issuing from the porous wall will be chlorinated according to the equation:

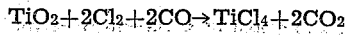
$$TiO_2 + 2Cl_2 + 2CO \rightarrow TiCl_4 + 2CO_2$$

The titanium tetrachloride will then circulate back into the main reaction stream, where it will oxidize to form the desired titanium oxide. The portion of the shielding gas mixture which is not used up in rechlorination of build-up particles will mix with the reaction stream, where the carbon monoxide will promptly burn to carbon dioxide, becoming merely an inert diluent. The chlorine, of course, is recovered along with the chlorine which is a product of the main reaction.

The volume of non-reactive gas to be used must be determined separately for each particular application, since it depends on the shape and size of the reaction vessel, velocity, temperatures, composition of the reacting gases, nature of the shielding gas, uniformity and degree of porosity of the porous wall, the degree of protection from deposit required, and many other factors.

In some applications it has been found advantageous to cool the porous surfaces which are to be protected. If they are near the temperature at which the reaction takes place, a fine crystalline deposit plugs the pores when the flow of a given shield gas is equal to that which is sufficient to give complete protection when the surface is not heated. If the process demands that the surface be hot, a larger gas volume can of course be used, which will afford adequate protection.

A comparison of Examples I and IV and their control runs demonstrates that, although dilution of the product gases by the shielding gas in a small unit of the type used in Example I is appreciable, it is substantially less in a larger unit of similar shape, due to the decreased ratio of wall surface to reactor volume. Hence, dilution in a plant size unit will be found to be substantially negligible. This is illustrated by the following table:

*Concentration of chlorine in product gases*

| Productive Capacity | Runs In Porous Reactor With N₂ Shield | Runs In Impervious Reactor, Without Shield Gas | Difference, Percent |
| --- | --- | --- | --- |
| 4½ #/hr. (Example I) | 23.9% Cl₂ | 29.1% Cl₂ | 5.2 |
| 100 #/hr. (Example IV) | 28.1% Cl₂ | 30.9% Cl₂ | 2.8 |
| 1000 #/hr. | 29.6% Cl₂ | 30.9% Cl₂ | 1.3 |

It should be understood that the above is not based on the minimum possible flow of shield gas, but merely on quantities which it has been found convenient to use in the experiments referred to. Also, the concentration of chlorine may be increased, rather than decreased, if employed as a component of the shielding gas.

It will be apparent that the invention can be readily adapted to fit the particular needs of any variation of the oxidation or hydrolysis processes for the production of metal oxides. By its practice, prior expensive and difficult batch types of operation can be readily converted to an economical, continuous type of process and without loss of yield through scale formation or the experiencing of shut-downs through apparatus plugging. Moreover, the practice of this invention does not appreciably affect the reaction itself; so that its full potentialities for the economical production of new and valuable forms of metal oxides are realized.

We claim as our invention:

1. A method for producing a metal oxide which comprises decomposing a halide of a metal with an oxidizing gas in the vapor phase within a restricted reaction zone, and during said decomposition maintaining a shielding inert gas film over the internal surfaces of said zone adapted to prevent substantial contact of the reactants with said surfaces, said shielding gas being introduced into said zone through a porous refractory wall of said zone and from a source maintained about its exterior.

2. A method for producing titanium oxide which comprises decomposing a titanium halide with an oxidizing gas in the vapor phase within a restricted reaction zone, and during said decomposition maintaining a film of an inert gas over the internal surfaces of said zone adapted to prevent substantial contact of the reactants with said surfaces by diffusing said inert gas through a porous refractory wall into said zone and from a source exteriorly maintained about said zone.

3. A method for producing titanium oxide which comprises decomposing titanium tetrachloride with an oxidizing gas in the vapor phase within a tubular, porous type reaction zone, and during the decomposition maintaining a film of an inert gas over the internal surfaces of said zone to prevent substantial contact of the reactants with said surfaces by flowing said inert gas through the porous walls of said zone from an external source maintained under pressure about the exterior of said zone.

4. A method for producing pigmentary titanium dioxide which comprises decomposing titanium tetrachloride with a humidified oxidizing gas within a tubular type reaction zone composed of porous refractory material, effecting said decomposition at temperatures ranging from at least 800° C. to about 1450° C., and throughout said decomposition maintaining a film of an inert protective gas over the internal surfaces of said zone to prevent the reactants and products of reaction from coming in substantial contact therewith by diffusing said inert gas from an external source surrounding said zone through said porous refractory material.

5. A process for producing a titanium oxide pigment which comprises reacting in the vapor phase titanium tetrachloride and a humidified oxygen-containing gas at a temperature in excess of 1000° C. and within an oxidizing zone the walls of which comprise a porous refractory material, effecting said reaction over a reactant retention period within said zone of from .01 to 5 seconds, and throughout said reaction maintaining a film of an inert gas over the internal surfaces of said zone to prevent substantial contact of said reactants with said surfaces by continuously diffusing an inert gas into said zone through said porous refractory material and from a source which is exteriorly maintained about said zone, and recovering the resulting TiO₂ product.

6. A process for producing a titanium oxide pigment which comprises reacting, at temperatures in excess of 1000° C., vaporized titanium tetrachloride with a humidified oxygen-containing gas, effecting said reaction within a reaction zone comprising a porous refractory tubular conduit, and throughout said reaction maintaining a layer of an inert gas within and over the internal surfaces of said zone by slowly diffusing said inert gas from an external source through said porous refractory whereby said surfaces are shielded during the reaction from direct contact with said reactants and thereafter recovering the resulting TiO₂ product.

7. A method for producing a titanium oxide pigment which comprises reacting in the vapor phase, and at temperatures in excess of 1000° C., titanium tetrachloride and air containing an amount of water vapor ranging from about .05% to 10% by volume, based on the total volume of gases being reacted, effecting said reaction within a refractory reaction zone comprising a tubular conduit of porous refractory material and over a reactant retention period therein of from .05 to 5 seconds, throughout said reaction maintaining a layer of a non-reactive gas over the internal surfaces of said zone to shield them from contact with said reactants by continuously diffusing said non-reactive gas through said porous material from a source maintained under pressure about and surrounding the exterior of said reaction zone, and recovering the resulting $TiO_2$ pigment.

8. A method for producing titanium oxide which comprises subjecting titanium tetrachloride to decomposition in the vapor phase with an oxygen-containing gas in a confined reaction zone made up of a porous ceramic material, and during said decomposition shielding the internal surfaces of said zone from substantial contact with the reactants by diffusing through the walls of said zone from an external source a sufficient quantity of an inert gas to form a protective film over said surfaces.

9. A method for producing titanium oxide which comprises subjecting titanium tetrachloride to decomposition in the vapor phase with an oxygen-containing gas in a confined reaction zone made up of porous silica, and during said decomposition shielding the internal surfaces of said zone from substantial contact with the reactants by diffusing through the walls of said zone from an external source a sufficient quantity of an inert gas to form a protective film over said surfaces.

10. A method for producing titanium oxide which comprises subjecting titanium tetrachloride to decomposition in the vapor phase with an oxygen-containing gas in a confined reaction zone made up of porous nickel, and during said decomposition shielding the internal surfaces of said zone from substantial contact with the reactants by diffusing through the walls of said zone from an external source a sufficient quantity of an inert gas to form a protective film over said surfaces.

CARL M. OLSON.
JOHN NELSON TULLY.

References Cited in the file of this patent

UNITED STATES PATENTS

| Number | Name | Date |
|---|---|---|
| 1,685,759 | Walter | Sept. 25, 1928 |
| 1,881,041 | Benjamin | Oct. 4, 1932 |
| 1,967,235 | Ferkel | July 24, 1934 |
| 2,062,358 | Frolich | Dec. 1, 1936 |